3,278,638
INTERNALLY CATALYZED HEAT-HARDENING ALKALINE REACTED ALKYLOLATED AMIDE INTERPOLYMER

Kazys Sekmakas, Chicago, Ill., assignor to De Soto Chemical Coatings, Inc., Chicago, Ill., a corporation of Delaware
No Drawing. Filed Sept. 24, 1962, Ser. No. 225,872
The portion of the term of the patent subsequent to Dec. 29, 1981, has been disclaimed
9 Claims. (Cl. 260—850)

The present invention relates to heat-hardening solvent-soluble non-gelled alkylolated acrylamide-containing interpolymers which are storage stable and internally catalyzed for rapid cure while possessing enhanced resistance to overcuring. The new copolymers of interpolymers in accordance with the invention are especially useful in organic solvent solution coating compositions for the deposit of water insoluble coatings.

Etherified alkylolated acrylamide-containing interpolymers have previously been used in organic solvent solution coating compositions and various difficulties have been encountered by the art. Thus, the alkylolated interpolymer contains reactive alkylol, e.g., methylol groups which, in the conventional interpolymer produced in the presence of acid, lead to room temperature reactivity and storage instability. To overcome the storage instability, a major proportion of the alkylol groups have been etherified, leading to interpolymers which are sluggish or slow in cure at elevated temperature. To enhance the cure, upon baking, small amounts of external acids, such as p-toluene sulphonic acid, have been used, but the external acid aggravates the stability problem and introduces pigment flocculation problems. To mitigate these difficulties, the art has introduced substantial proportions, such as from 5–20% by weight, of aliphatic ethylenically unsaturated carboxylic acid into the linear interpolymer by addition copolymerization, the alkylolated interpolymer being extensively etherified to achieve storage stability. Unfortunately, when etherification of the convention alkylolated interpolymer is sufficient for adequate storage stability, even large amounts of internal acid provide only moderate reactivity under usual baking conditions. Moreover, the internal acid in a proportion sufficient to effectively catalyze the cure of the sluggish etherified interpolymer, provides a system which lacks resistance to embrittlement upon overcuring.

The present invention is directed to overcoming the foregoing difficulties to provide storage stable interpolymers which cure rapidly upon baking and which possess enhanced resistance to overcuring.

In accordance with the present invention, the alkylolated acrylamide-containing interpolymers are produced by a single stage reaction in the presence of a small amount of alkaline material, the copolymerizable materials forming the interpolymers include a small proportion of ethylenically unsaturated carboxylic acid to provide an alkylolated interpolymer product having an acid value (measured on the non-volatile resin solids) of from about 3–20, preferably from 8–15, and the alkylolated interpolymer is etherified, if at all, to only a minor extent so that at least 25%, preferably at least 50% and most preferably at least 65% of the alkylol groups are free, e.g., unetherified.

It has been found that the essentially unetherified alkylolated interpolymer produced in a single stage in the presence of alkaline material is essentially non-reactive at room temperature despite the presence of a small carboxyl functionality in the interpolymer and that this small carboxyl functionality is a powerful curing catalyst at elevated baking temperatures providing very rapid cures. Moreover, the catalytic activity is only moderate in the sense that considerable variation in baking times and temperatures can be tolerated before overcuring embrittlement is noticeable. However, excess acid, even in amounts less than are conventionally used, leads to a pronounced tendency toward embrittlement upon overcuring and should be avoided.

In line with the foregoing, amido hydrogen atoms of the acrylamide component of the interpolymer are replaced by the structure

where R is selected from the group consisting of hydrogen, furyl, and saturated lower aliphatic hydrocarbon radicals containing up to 10 carbon atoms, and $R_1$ is selected from the group consisting of hydrogen, and alkyl, alkoxy alkyl and aryl radicals containing up to 10 carbon atoms in the radical. Preferably, R is hydrogen and $R_1$, to the extent that etherification is desired or permitted, is an alkyl radical containing from 3–8 carbon atoms.

Superimposed upon the foregoing is the further requirement that at least 50% of $R_1$ is hydrogen.

As will be more fully appreciated hereinafter, considerable variation is permissible in the kind and ratio of monoethylenically unsaturated monomers which are used, the aldehyde modifying agent and the etherifying agent. Moreover, there is also a considerable variation which can be made in the specific nature of the carboxylic acid component of the interpolymer.

While it is preferred to employ acrylamide in proportions of from 5 to 45%, preferably from 5 to 30% by weight, with unsaturated monomers containing the $CH_2=C<$ group, the invention is not limited to acrylamide or to the presence of a terminal methylene group. Thus, other acrylamide monomers such as methacrylamide and itaconate diamide may be used. Indeed, amides of other unsaturated acids such as maleic acid diamide, fumaric acid diamide, sorbic acid amide and muconic acid diamide may less desirably be used.

While the preferred unsaturated monomers interpolymerized with acrylamide do contain the $CH_2=C<$ group and it is preferred to use combinations of the monomers which form hard polymers such as styrene, vinyl toluene and methyl methacrylate with monomers which form soft polymers such as monoethylenically unsaturated carboxylic acid esters having a terminal aliphatic hydrocarbon group containing from 2–20 carbon atoms, illustrated by ethyl acrylate, butyl acrylate, 2-ethylhexyl acrylate, and stearyl acrylate, the invention is not restricted to the selection of monomers containing the $CH_2=C<$ group or to the selection of preferred combinations of monomers. Thus, monomers which do not contain the $CH_2=C<$ group may be interpolymerized with acrylamide either alone or in the presence of monomers which do contain the $CH_2=C<$ group. Particular attention is directed to maleic acid or fumaric acid diesters, and butene-2 which are useful in the production of interpolymers with acrylamide. Still other monomers which may be used are vinyl chloride, vinyl acetate, 1,3-butadiene, and vinyl ethers such as n-butyl vinyl ether, etc.

The specific nature of the ethylenically unsaturated carboxylic acid used to provide the desired acid value is of secondary significance to the invention so long as only small amounts of acid are used. Thus, aliphatic monomers such as acrylic acid, methacrylic acid, itaconic acid, maleic acid, fumaric acid, monobutyl maleate or fumarate, crotonic acid and other similar monoethylenically unsaturated acids may be used in amounts of from about 0.5–1.5% by weight of total polymerizable material. However, the invention is not limited to acids of the above type since other acids such as vinyl benzoic acid are also useful. Polyethylenically unsaturated polycarboxylic acids such as carboxyl-terminated unsaturated polyester resins may also be used to advantage.

Numerous ethylenically unsaturated polyesters may be employed for copolymerization in accordance with the invention, it being understood that these polyesters are polyethylenically unsaturated and not monoethylenically unsaturated. The unsaturation can be introduced into the polyester by the polyesterification of an unsaturated polycarboxylic acid such as maleic acid, fumaric acid, itaconic acid, aconitic acid, glutaconic acid or citraonic acid or by the polyesterification of an unsaturated polyhydric alcohol such as 2-butene-1,4-diol, thus providing highly reactive unsaturation in the linear backbone of the polyester.

On the other hand, unsaturation can be introduced into the unsaturated polyester resin through the presence of unsaturated side chains as by the use of unsaturated monofunctional components such as unsaturated monohydric alcohols or unsaturated monocarboxylic acids. Thus, a proportion of unsaturated monohydric alcohol may be used such as allyl alcohol, methallyl alcohol or crotyl alcohol. Unsaturated monocarboxylic acids are illustrated by crotonic acid and by fatty acids containing conjugated unsaturation such as eleostearic acid, licanic acid, or dehydrated castor oil fatty acids, this conjugated unsaturation providing reactive double bonds to enable copolymerization with acrylamide and the other monoethylenically unsaturated monomers which are copolymerized. Incorporation of monocarboxylic acids is facilitated by the use of glycerine in the production of the polyester. When the glycerine polyester is preformed, the mono-acid reacts with the secondary hydroxyl group of the glycerine residue, but, as is known, the polybasic acid, the glycerine and the mono-acid may all be polyesterified together in a single reaction. Since the polyester used need not be of high molecular weight, the monofunctional acid or alcohol may function as a chain terminating agent. Other monofunctional agents are also usable to introduce unsaturation for copolymerization such as allyl glycidyl ether. In other words, the unsaturation in the polyester required for copolymerization is preferably selected from the group consisting of: (1) alpha,beta unsaturation; (2) beta,gamma unsaturation; or (3) conjugated unsaturation. Preferably, the unsaturation is in a chain not a part of the linear polyester backbone to thereby reduce the danger of gelation.

Broadly, the unsaturated polyester resin should contain about 0.005 to 0.40 gram mol of ethylenically unsaturated component per 100 grams of polyester. Of course, the precise preferred proportion of unsaturation will vary depending on the reactivity of the unsaturated component (maleic acid is more reactive than crotonic acid). Moreover, practical aspects of processing must be kept in mind since, with less unsaturation, one may copolymerize for longer periods of time and/or more vigorous conditions. With more unsaturation, there is a tendency to gel, especially with more reactive materials such as maleic anhydride or acid. However, one can terminate the reaction before gelation, especially when the reaction is carefully supervised, or the reaction may be effected under very mild conditions. Preferably, and when using polyesters containing unsaturation in the backbone of the polyester as by using maleic acid, the polyester resin desirably contains 0.01–0.1 gram mol of unsaturated component per 100 grams of polyester. With less reactive polyesters such as those containing the unsaturation in a side chain as by the use of crotonic acid or allyl alcohol, the polyester resin desirably contains from 0.03–0.3 gram mol of unsaturated component per 100 grams of polyester.

When the unsaturated polyester resin is used to provide some or all of the carboxyl functionality required in the invention, the components of the polyester, their proportions, and the extent of polyesterification are selected to provide carboxyl termination, this carboxyl termination being desirably, but not necessarily, achieved by excess carboxyl functionality (more equivalents of carboxyl than hydroxyl). In producing the polyester, it is sometimes desired to employ an excess of hydroxy-containing component in order to drive the esterification reaction forward, excess unreacted hydroxy component being removed from the completed polyester. Thus, and with respect to proportions, the proportions of components in the final polyester may, or may not, conform with the proportions of reactants, depending upon the technique used for the formation of the polyester.

The proportion of unsaturated polyester which is used and its acid value are selected to provide the desired acid value in the final interpolymer. It should be noted that the polyester may include some terminal hydroxyl functionality, but this does not interfere with the function of the carboxyl functionality and it also serves to provide some hydroxyl cross-linking sites which can be utilized when the interpolymer is cured.

While the molecular weight of the unsaturated polyester is of secondary significance so long as the polyester is not gelled, it is desirable to employ polyesters which have a viscosity in n-butanol at 80% solids in the range of form C to $Z_6$, preferably in the range of from V to $Z_2$ measured on the Gardner-Holdt scale at 25° C.

The proportion of oil which is incorporated in the polyester is of secondary significance in the invention. Indeed, oil may be entirely omitted.

The interpolymers of the invention are produced by a single stage solution copolymerization which is more fully described in my prior copending application Serial No. 100,804, filed April 5, 1961, the disclosure of which is hereby incorporated by reference. Thus, organic solvent, aldehyde, unsaturated polyester, an acrylamide and at least one other monoethylenically unsaturated monomer are reacted with one another in the presence of heat and in the presence of a basic catalyst and a free-radical generating polymerization catalyst, and polymerization and alkylolation take place simultaneously. Preferably, the monomers are added to the organic solvent solution which is added slowly and at a uniform rate (desirably by continuous addition) to permit more precise control of the reaction and to provide a more uniform interpolymer product. Also, continous monomer addition enables temperature control during the reaction despite the highly exothermic reaction which normally occurs. In the presence of alcohol, continuous removal of water, as by refluxing coupled with azeotropic distillation, etherification takes place at the same time and at least some of the methylol groups in the alkylolated product are etherified.

The alkaline catalyst is essential to the single stage reaction, for its absence leads to the production of an insoluble gelled structure which is not useful.

At least 0.1% of alkaline catalyst, based on the weight of monomers being copolymerized, is essential to avoid gelation. On the other hand, it is preferred to use not more than 1.0% of alkaline catalyst because the products so-produced have slow curing properties and are less desirable.

Any alkaline compound may be used, those having a nitrogen base being preferred. Amines, and especially tertiary amines are particularly preferred. Thus, inorganic alkaline compounds such as alkali metal hydroxides and alkaline earth metal hydroxides are broadly operable, but are not preferred because these introduce impurities into the resinous product. Ammonia is quite suitable as are quaternary ammonium compounds such as tetramethyl ammonium hydroxides. Amines such as ethyl amine and butyl amine may be used. However, tertiary amines illustrated by triethyl amine, tripropyl amine and tributyl amine are particularly preferred. The degree of etherification may be changed, and thereby controlled, by changing the amount of alkaline catalyst which is employed.

Any free-radical generating polymerization catalyst may be used, the selection of catalyst being determined by the desired temperature of the polymerization reaction. The important point is that the agent liberate free radicals under the conditions of polymerization so that the addition polymerization is facilitated. The class of free-radical generating polymerization catalysts is too well known to require elucidation except to point out that typical catalysts are illustrated in the examples.

The aldehyde modifying agent is desirable used in an amount of from 0.2–5 equivalents of aldehyde, and preferably in an amount of from 1–4 equivalents of aldehyde for each amide group used in the formation of the acrylamide interpolymer. The preferred aldehyde is formaldehyde. Other monoaldehydes, including acetaldehyde, propionaldehyde, butyraldehyde, and furfural, or substances yielding an aldehyde, such as paraformaldehyde, hexamethylene tetramine or trioxymethylene can also be used.

Minor etherification of the aldehyde-modified (alkylolated) amide interpolymer may be preferred in some instances, but is not essential. When etherification is employed, lower alcohols containing up to 8 carbon atoms, especially butanol, are preferred. The degree of etherification is easily controlled in accordance with the invention by adjusting the proportion of alkaline catalyst and by controlling the amount of water which is removed.

The particular nature of the organic solvent used for the solution copolymerization or for the solvent solution application of the interpolymers is not a critical aspect of the invention. Butanol, preferably in admixture with xylol, is a preferred solvent system, but the invention is not limited to specific solvents since many others are available and useful, such as toluene, methyl ethyl ketone, methyl isobutyl ketone, acetone, butyl acetate, 2-ethoxy ethanol, 2-butoxy ethanol, etc.

While the alkylolated acrylamide-containing interpolymers of the invention are importantly useful alone in organic solvent solution coating compositions, they may also be utilized in conjunction with other film-forming resins such as aminoplast resins, especially heat-hardening solvent-soluble condensation products of a triazine with excess formaldehyde, vinyl resins, etc.

It will be understood that the invention is illustrated, but not limited by the specific examples presented hereinafter. It will also be evident that the products of the invention, while useful in diverse types of heat-hardening resinous compositions are primarily useful in the coating art, in which event they are applied either alone or in combination with other resins, from a compatible organic solvent solution. These coating solutions may be pigmented or contain dyes, flow control agents, waxes and various other components as will be evident to those skilled in the art.

EXAMPLE 1

An oil-modified polyester resin of small acid value and which is useful for incorporation in acrylamide-containing interpolymers is prepared by charging by weight, 250 parts of crotonic acid, 790 parts of dehydrated castor oil fatty acids, 785 parts of glycerine, 400 parts of isophthalic acid and 1 part of hydroquinone into a reactor equipped with an agitator, thermometer, nitrogen inlet tube, Dean-Stark trap and condenser. The mixture is then heated to 420° F. and maintained at this temperature until an acid value of 5 is reached. There are then added to the mixture 240 parts of a technical grade of 1,1′ - isopropylidenebis(p - phenyleneoxy) di - 2-propanol, 160 parts of phthalic anhydride and 255 parts of azelaic acid, and the mixture is maintained at 390° F. to an acid value of 8.0. Butyl alcohol is then added to the product to provide a solution containing 80.3% solids.

The final characteristics of the polyester are:

Solids (percent) _____ 80.3
Viscosity (Gardner) _____ V
Color (Gardner) _____ 5–6
Acid value (non-volatile) _____ 8.0

EXAMPLE 2

Three interpolymers are produced incorporating the unsaturated polyester of Example 1 and different proportions of ethylenically unsaturated carboxylic acid to provide interpolymers of different acid value as indicated below in which all parts are by weight:

| Interpolymer Composition | Polymer A | Polymer B | Polymer C |
| --- | --- | --- | --- |
| Acrylamide | 10 | 10 | 10 |
| Polyester of Example 1 (100% solids) | 20 | 20 | 20 |
| Styrene | 25 | 25 | 25 |
| 2-ethyl hexyl acrylate | 10 | 10 | 10 |
| Methyl methacrylate | 6 | 5 | 3 |
| Ethyl acrylate | 29 | 29 | 29 |
| Glacial methacrylic acid | 0 | 1 | 3 |
| | 100 | 100 | 100 |

Polymers A, B and C are produced as indicated below for the production of polymer A.

Charge composition: Grams
    Aromatic hydrocarbon solvent (boiling range
      of 145–195° C.) _____ 2700
    n-Butyl alcohol _____ 540
    40% formaldehyde solution in n-butanol ____ 405
    2-ethyl hexyl acrylate _____ 900
    Acrylamide _____ 900
    n-Butyl alcohol _____ 170
    2-butoxy ethanol _____ 1935
    40% formaldehyde solution in n-butanol ____ 1350
    Ethyl acrylate _____ 2610
    Styrene _____ 2250
    Methyl methacrylate _____ 540
    Unsaturated polyester produced in Example 1
      (used as a solution containing 80.3% solids
      in butanol) _____ 2250
    Triethyl amine _____ 27
    Benzoyl peroxide _____ 18
    Di-tertiary-butyl peroxide _____ 54
    Azobisbutyronitrile _____ 54
    Tertiary dodecyl mercaptan _____ 100
    Cumene-hydroperoxide _____ 45

*Procedure for polymerization*

Polymer A is prepared by charging into a reactor equipped with an agitator, condenser, Dean-Stark trap, thermometer, and nitrogen inlet tube, 2700 grams of aromatic hydrocarbon solvent (boiling range of 145–195° C.), 540 grams of butanol and 405 grams of a 40% formaldehyde solution in n-butanol (containing 8% of water).

The initial charge is heated to reflux temperature (235–240° F.). Then dissolve 900 grams of acrylamide in 1170 grams of butanol, 1935 grams of 2-butoxy ethanol, and 1350 grams of 40% formaldehyde solution in n-butanol (containing 8% of water). Add to this monomer blend the remaining monomers and catalysts and the 2250 grams of unsaturated polyester of Example 1.

The above monomer-catalyst-formaldehyde blend is added to the reactor over a 2½ hour period of time and the mixture is maintained at 240–245° F. while concomitantly removing water by azeotropic distillation, the water being collected in the Dean-Stark trap. A total of 175 grams of water are distilled off (the 1755 grams of 40% formladehyde solution in n-butanol containing 140 grams of water).

After 175 grams of water are distilled off, the Dean-Stark trap is removed and the reaction mixture is held at reflux temperature for an additional 9 hours.

The resulting interpolymers have the following physical characteristics:

| Property | Polymer A | Polymer B | Polymer C |
|---|---|---|---|
| Solids, percent | 54.1 | 54.4 | 55.0 |
| Color (Gardner) | 1–2 | 1–2 | 2 |
| Viscosity (Gardner) | W | V–W | V–W |
| Acid value (non-volatile) | 3.0 | 11.2 | 25.5 |

Polymers A, B and C are formulated to provide gloss enamels A, B and C, each containing 32% non-volatile resin and 28% of titanium dioxide pigment. These enamels are applied to aluminum panels using a #40 wire wound rod and baked in a gas fired oven maintained at 475° F. for different periods of time and the baked panels are rubbed with toluol to note the time required to reach base metal and thereby determine the degree of cure. For purposes of comparison, conventional etherified acrylamide interpolymers are conventionally cured to a rating of 60 seconds resistance to toluol (indicative of a full cure) by a 90 second exposure at 475° F.

The results of the test are as follows:

| Baking Time at 475° F. | Resistance to Toluol in Seconds | | |
|---|---|---|---|
| | Enamel A | Enamel B | Enamel C |
| 50 seconds | 5 | 60 | 60 |
| 90 seconds | 60 | 60 | 60 |

Enamel C overcured after 90 seconds and is brittle. The small acid value in enamel B provides a full cure in the conventional 90 seconds and also at 50 seconds and, in neither event is there an overcure as indicated by a brittle film. Enamel A requires the conventional 90 seconds for cure, but it cures fully within this period showing the catalytic activity of an acid value as low as 3.0 and also showing the further improvement obtained when polymers of preferred acid value are used as in Enamel B.

As a matter of interest, it has been determined that the unsaturated polyester of Example 1 is incorporated into the polymer chain of the interpolymer by addition copolymerization, by comparing the results obtained substituting succinic acid for maleic acid in otherwise identical oil-free polyesters. Although the interpolymer produced using a saturated polyester containing succinic acid has the same acid value as the interpolymer produced from the unsaturated polyester produced from maleic acid, the respective interpolymers possessed completely different characteristics. More specifically, the product produced from the saturated succinic acid-containing polyester tended to separate on aging and baked films produced therefrom were dull and hazy. In contrast, the unsaturated maleic polyester produced a clear resin which did not separate on aging and which, when baked as a film, provided a cured product which was clear and glossy. From this, it is concluded that the unsaturated polyester of Example 1 enters the interpolymer through the ethylenic unsaturation contained therein.

The invention is defined in the claims which follow.

I claim:

1. A storage stable and internally catalyzed heat-hardening solvent-soluble non-gelled product produced by the addition interpolymerization of (A) a monoamide of an ethylenically unsaturated monocarboxylic acid, (B) polymerizable ethylenically unsaturated material copolymerizable with said amide, and (C) ethylenically unsaturated carboxylic acid-containing material comprising carboxyl terminated unsaturated polyester resin, said interpolymer being reacted with aldehyde in the presence of alkaline material to replace amide hydrogen atoms by the structure

in which R is selected from the group consisting of hydrogen, furyl, and saturated lower aliphatic hydrocarbon radicals containing up to 10 carbon atoms and $R_1$ is selected from the group consisting of hydrogen, and alkyl, alkoxy alkyl and aryl radicals containing up to 10 carbon atoms in the radical, at least 25% of $R_1$ being hydrogen, and said acid-containing material providing an acid value of from about 3 to about 20.

2. An interpolymer as recited in claim 1 in which said amide is an acrylamide and said component (B) comprises monomer having a $CH_2\!=\!C\!<$ group.

3. An interpolymer as recited in claim 2 in which the amido groups of the acrylamide component of said interpolymer are reacted with formaldehyde.

4. An interpolymer as recited in claim 1 in which said amido hydrogen atoms are reacted with formaldehyde to form methylol groups and said methylol groups are etherified with an alkanol containing from 3–8 carbon atoms, said methylol groups remaining unetherified to an extent of at least 65%.

5. An interpolymer as recited in claim 1 in which said unsaturated polyester resin contains about 0.005 to 0.40 gram mol of ethylenically unsaturated component per 100 grams of polyester.

6. An interpolymer as recited in claim 1 in which said interpolymer includes from 5–50% by weight of total polymerizable material of unsaturated polyester in which the unsaturation in said polyester is selected from the group consisting of (1) alpha,beta! unsaturation, (2) beta,gamma unsaturation, and (3) conjugated unsaturation, and said unsaturated polyester resin contains about 0.005 to 0.40 gram mol of ethylenically unsaturated component per 100 grams of polyester.

7. An interpolymer as recited in claim 7 in which said polyester has a viscosity in n-butanol at 80% solids in the range of from C to $Z_6$ measured on the Gardner-Holdt scale at 25° C.

8. An interpolymer as recited in claim 1 in which said interpolymer has an acid value of from 8–15.

9. An article having a metal surface having as a coating thereon a hardened resinous composition of claim 1.

References Cited by the Examiner

UNITED STATES PATENTS

| | | | |
|---|---|---|---|
| 2,978,437 | 4/1961 | Christenson | 260—72 |
| 3,118,853 | 1/1964 | Hart et al. | 260—850 |
| 3,163,615 | 12/1964 | Sekmakas | 260—22 |
| 3,163,623 | 12/1964 | Sekmakas et al. | 260—72 |

MURRAY TILLMAN, *Primary Examiner.*

J. T. GOOLKASIAN, *Assistant Examiner.*

UNITED STATES PATENT OFFICE
CERTIFICATE OF CORRECTION

Patent No. 3,278,638                                 October 11, 1966

Kazys Sekmakas

It is hereby certified that error appears in the above numbered patent requiring correction and that the said Letters Patent should read as corrected below.

Column 1, line 41, for "convention" read -- conventional --; column 3, line 11, for "citraonic" read -- citraconic --; column 4, lines 64 and 65, for "hydroxyides" read -- hydroxides --; column 8, line 42, for "betal" read -- beta --; line 47, for the claim reference numeral "7" read -- 6 --.

Signed and sealed this 29th day of August 1967.

(SEAL)
Attest:

ERNEST W. SWIDER                               EDWARD J. BRENNER
Attesting Officer                                       Commissioner of Patents